United States Patent [19]
Price et al.

[11] 3,806,215
[45] Apr. 23, 1974

[54] WEDGE MOUNTED MACHINE ELEMENT

[75] Inventors: Connor E. Price; William J. Derner, both of Indianapolis, Ind.

[73] Assignee: FMC Corporation, San Jose, Calif.

[22] Filed: June 21, 1972

[21] Appl. No.: 265,010

[52] U.S. Cl.............................. 308/236, 287/52.09
[51] Int. Cl. ........................................... F16c 33/30
[58] Field of Search .......... 308/236; 287/114, 52.09

[56] References Cited
UNITED STATES PATENTS

| | | | |
|---|---|---|---|
| 3,709,575 | 1/1973 | Howe | 3.8/236 |
| 2,792,264 | 5/1957 | House | 308/236 |
| 3,079,186 | 2/1963 | Williams | 287/114 |
| 2,118,891 | 5/1938 | Marino | 287/52.09 |
| 803,460 | 10/1905 | Anderson | 287/52.09 |
| 2,228,282 | 1/1941 | Miller | 308/236 |
| 3,129,038 | 4/1964 | Benson | 308/236 |

*Primary Examiner*—Charles J. Myhre
*Assistant Examiner*—R. H. Lazarus
*Attorney, Agent, or Firm*—John F. Verhoeven; C. E. Tripp

[57] ABSTRACT

A wedge-shaped sleeve is inserted between the inner race of a bearing and a shaft to clamp the bearing to the shaft. The sleeve, which is resilient with a longitudinal slit, has a rib thereon to engage a groove in the bearing race to hold the sleeve and bearing in assembled relation when the sleeve is relaxed. An alternative sleeve, which is split to constitute two separate halves, is disclosed. There is also shown a bearing mounted in a bore in which the tapered sleeve is received between the bore and the outer race of the bearing.

14 Claims, 8 Drawing Figures

PATENTED APR 23 1974
3,806,215
SHEET 1 OF 2
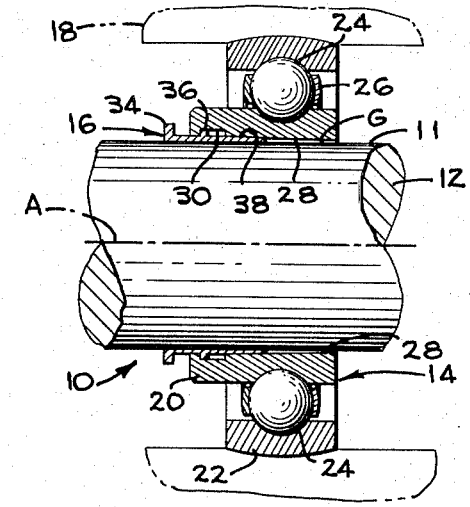
FIG.1
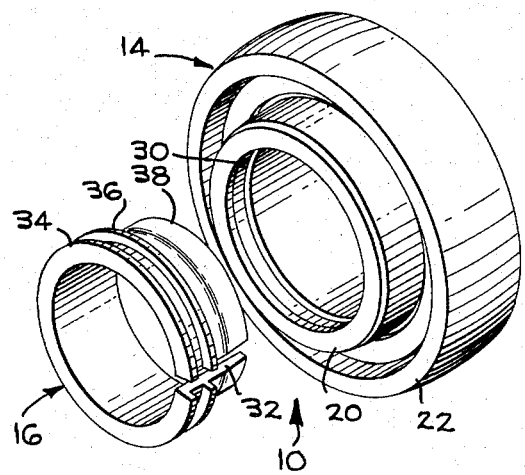
FIG.2
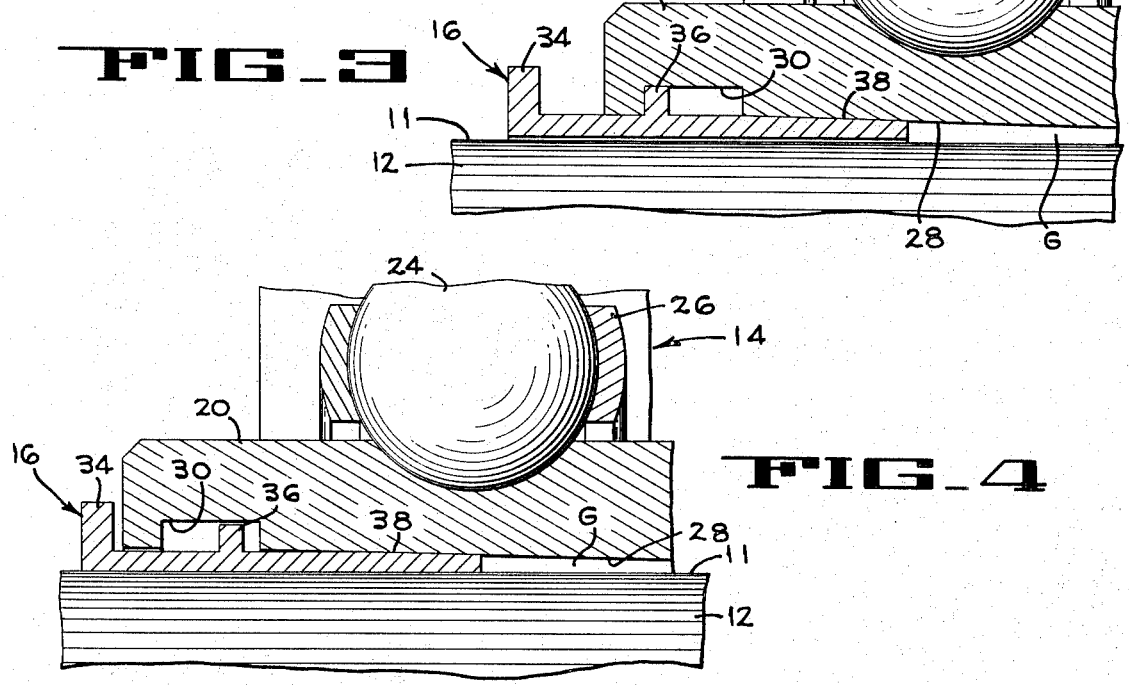
FIG.3
FIG.4

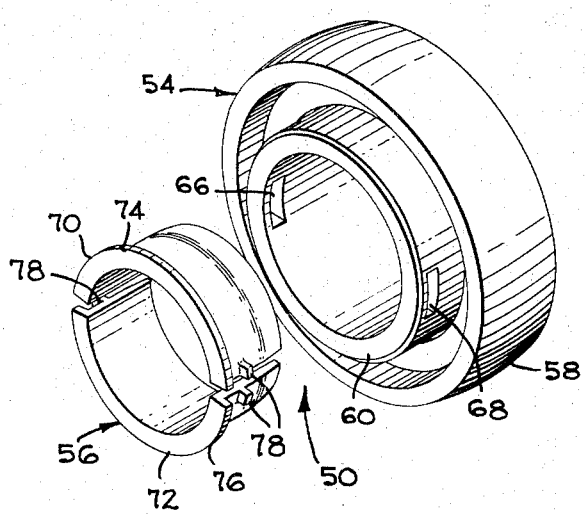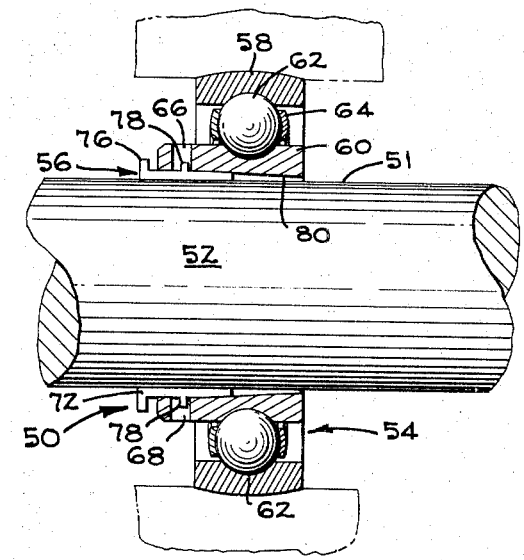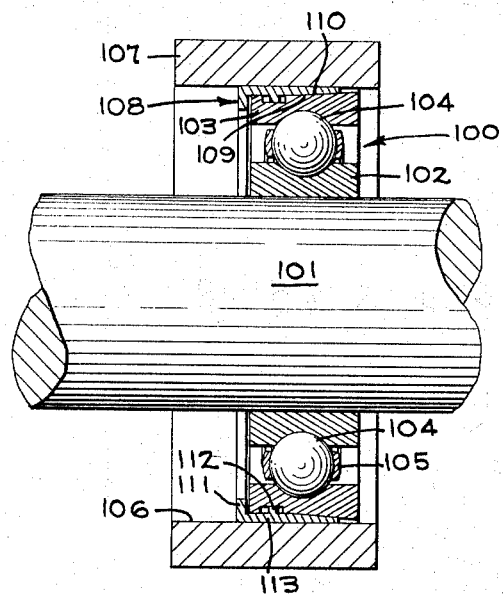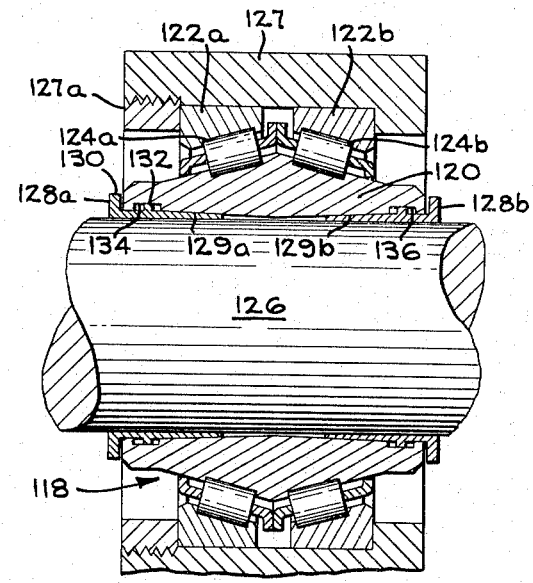

WEDGE MOUNTED MACHINE ELEMENT

BACKGROUND OF THE INVENTION

The present invention relates to the clamping of machine elements, such as bearings, sleeves, sprockets, gears, or the like, to a mounting surface.

Many bearings used in light or medium duty applications are conventionally fitted loose to a shaft and held at one end of an extended inner ring by a collar and setscrew. Such mounting of the bearing, which provides only limited points of contact, often results in excessive fretting and/or inner ring breakage.

It is known to use, in the mounting of anti-friction bearings on a shaft, a wedge-shaped sleeve as shown, for example, in U.S. Pat. Nos. 1,116,845, 1,957,062, 2,045,896, 2,052,108, 2,098,709, 2,118,891, 2,213,400, 2,228,282, 2,230,912, 2,714,538 and 2,970,018. One problem with the use of a mounting sleeve is that it not only adds parts to the assembly, but increases the time and difficulty of mounting the bearing. Frequently, additional parts, such as collars, locknuts, lockwashers, setscrews, and/or springs are required to clamp the bearing to the shaft. It will be recognized that each different sized bearing will require different sized sleeves and auxiliary parts which must be separately stored and brought together for assembly. Similar difficulties exist in the use of sleeves to mount other machine elements.

SUMMARY OF THE INVENTION

In the present invention a simple, effective mounting of a machine element, such as a bearing, on a shaft or in a bore, by means of a wedge sleeve, is effected without the complexity usually associated with wedge sleeve element mountings.

In brief, the wedge mounting sleeve, which is resilient, is normally loosely engaged with the machine element by means of complementary surface conformations on the respective members. The sleeve is resilient and, in the relaxed condition, will remain engaged with the machine element. Thus, a machine element, such as a bearing, and the appropriate sleeve therefor, can be shipped, stored, and transported to the assembly area for use, as a single unit. Although the bearing and wedge sleeve are held in assembled relation even after assembly on the shaft or in the bore, the wedge sleeve can move axially with respect to the bearing for wedging action by virtue of the loose connection therebetween. When the resilient sleeve and bearing are removed from the shaft or bore, the resilient sleeve can be momentarily deformed for assembly with, or disassembly from, the bearing.

In the preferred form of the invention, the wedge sleeve has a longitudinal slit which permits the sleeve to expand or contract. The sleeve also has a rib which is adapted for receipt in a wide groove in the bearing. If we assume that the bearing is to be mounted on a shaft, a portion of the inner surface of the inner race of the bearing and the outer surface of the sleeve member will be oppositely tapered to define complementary wedge surfaces for a wedging action therebetween.

At some time prior to mounting on a shaft, the sleeve member is manually compressed so that the sleeve, which has the coupling rib on the outer surface, can be inserted into the inner race of the bearing where the coupling rib is received in the groove which is in the internal surface of the inner race member of the bearing. As thus assembled, the two parts can be shipped and stored together to eliminate the possibility of mismating the parts as the bearing is assembled on the shaft. The wedge sleeve and bearing are mounted on the shaft as a unit and the wedge sleeve is pushed into the inner race of the bearing (which is possible by virtue of the loose fit of the collar in the groove) to compress the sleeve into tight gripping relationship with the shaft and to wedge the inner race of the bearing tightly onto the wedge sleeve.

If the bearing is to be mounted into a bore, the wedge sleeve is forced between a wedge surface on the outer race of the bearing and the bore.

In mounting the bearing either on a shaft or in a bore, a divided wedge sleeve can be used and, instead of a rib, projections can be provided on the wedge sleeve for mating engagement with a groove or holes in the bearing.

Thus, the bearing mounting construction of the present invention comprises a bearing and wedge sleeve which can be shipped and stored as a unit without danger of disassembly, and can be tightly clamped on a shaft (or, in a modified form, in a bore) without the need of auxiliary parts.

BRIEF DESCRIPTION OF THE DRAWINGS

FIG. 1 is a view in perspective of a sleeve and bearing constructed in accordance with the present invention in disassembled relationship.

FIG. 2 is a view in cross-section of the sleeve and bearing of FIG. 1 when assembled and mounted on a shaft.

FIGS. 3 and 4 are enlarged, fragmentary views taken as the view of FIG. 3 showing the sleeve in a nonclamping position and in a clamping position, respectively.

FIG. 5 is a view similar to FIG. 1, showing a modified form of the sleeve and bearing.

FIG. 6 is a view in cross-section of the sleeve and bearing of FIG. 5 when assembled and mounted on a shaft.

FIG. 7 is a view similar to FIG. 6 of yet another modified form of the sleeve and bearing.

FIG. 8 is a view in cross-section of a bearing mounted on a shaft with two sleeves.

DESCRIPTION OF THE PREFERRED EMBODIMENTS

There is shown in FIGS. 1 and 2 a bearing mounting construction 10 adapted for receipt on a mounting surface 11 which is the outer cylindrical surface of shaft 12, having a central axis A. The bearing mounting construction 10 consists of a bearing 14, and a wedge-shaped sleeve member 16. The sleeve member 16 is wedged between the shaft and the bearing to clamp the bearing tightly on the shaft even though the bearing is significantly larger than the shaft. It will be understood that, in the usual installation, the bearing 14 will support another member such as a hub, or will be received in another member such as a housing. For purposes of this disclosure, a member 18 is shown in dashed lines with the understanding that there is relative rotation between the member 18 and the shaft 12, regardless of the function of the member 18. Although the bearing 14 shown for illustrative purposes is a ball bearing, it should be noted that the mounting construction of the present invention is as suitable for other machine elements, including a roller bearing or a sleeve bearing, as for the ball bearing shown.

The bearing 14 has an inner race member 20, an outer race member 22, and an intermediate circle of balls 24 which are held in a retainer ring 26. The inner race of the bearing has an inner tapered surface 28 and an internal circular groove 30 extending completely around the race.

Regardless of the type of bearing, it sometimes happens that the annular inner race of the bearing has a slightly larger diameter than the shaft on which it is to be mounted or in the case of an outer race, a slightly smaller diameter than the housing bore diameter. This is more often true with bearings designed to carry light to medium loads. Frequently, with this class of bearing, the inner race is extended axially to receive a set screw or screws therein by which the inner race, and thus the bearing, is secured to the shaft. Sometimes, a clamping collar is utilized to hold the inner race of the bearing on the shaft. Neither the set screw nor the clamp collar is effective to hold the bearing on the shaft as tightly as is required for many applications.

The wedge-shaped sleeve 16, which is normally made of formed or turned steel, has a longitudinal slit 32 extending the entire length of the sleeve. The sleeve is resilient and can be, by virtue of the slit, expanded or contracted. The sleeve has integral therewith two ribs 34, 36 extending outwardly. One rib 34 is at one end of the sleeve and the other rib 36 is spaced inwardly therefrom. The outer surface of a portion of the sleeve (that portion most remote from end rib 34) is tapered to define a tapered skirt portion 38.

With reference to FIG. 1, it should be noted that the sleeve 16 can be compressed (manually or with a levered tool) so that the sleeve can be inserted into the inner race of the bearing 14. When the sleeve, which is resilient, is released to return to its relaxed condition, the inner rib 36 will be confined loosely in the groove 30 in the inner race member. Since the groove 30 is considerably wider than the rib 36, the rib can be shifted axially with respect to the bearing but will not become disengaged therefrom as long as the sleeve member is in its relaxed condition. It is only by again compressing the sleeve to disengage the rib from the groove that the sleeve and bearing can be separated. Thus, the rib, or projection, 36 and the groove, or cavity, 30 define surface conformations normally holding the sleeve and bearing in assembled relationship as long as the sleeve is relaxed. The merit in this construction is that the bearing, with the appropriate sleeve, can be shipped and stored as a unit, to considerably reduce the handling of the parts, to minimize the storage facilities required, and to eliminate the possibility of mismatching the bearing and sleeve at assembly.

To install the bearing assembly, or bearing mounting construction, on the shaft, the bearing and sleeve, preassembled into a unit, are slid over the shaft. The sleeve, in its relaxed state (as it is when the rib 36 is engaged loosely in groove 30) fits loosely on the shaft 12 and can be shifted easily to any position thereon. At this time, the sleeve will be positioned relative to the inner bearing race as shown in FIG. 3.

To tighten the sleeve on the shaft and clamp the bearing in position on the shaft, the sleeve member is driven to the right, as by the application of force, to the position in the race 20 shown in FIG. 4. As the sleeve member moves to the right relative to the race, it is contracted (by virtue of the wedging action between the tapered surfaces on the sleeve and the inner race member) and tightens on the shaft. At the same time, the bearing is tightened with respect to the shaft because the wedge-shaped sleeve member is being driven into a gap G between the inner race member and the shaft which narrows toward the right (as viewed in FIGS. 3 and 4) because of the taper portion on the inner surface 28 of the inner race member. It should be noted that in the tightened position of the bearing illustrated in FIG. 4, the end rib 34 is spaced slightly from the radial end face of the inner race 20 of the bearing. Thus, a tapered tool, such as a screwdriver, or a special tool, can be inserted into the gap between the rib and the radial face for loosening of the wedge 16 (to the position shown in FIG. 3) and removal of the bearing.

A second embodiment of the invention is shown in FIGS. 5 and 6. In this embodiment the bearing assembly 50, which is to be clamped to the mounting surface 51 on shaft 52, also consists of a bearing member 54 and a sleeve member 56. The bearing member 54 has an outer race 58, an inner race 60, and intermediate anti-friction members which can be balls or rollers, but which are illustrated as balls 62. A retainer 64 holds the circle of balls in proper position in the bearing. In this embodiment, the inner race member has no circular groove. Instead, two cavities, or openings 66, 68, 180° apart, extend through or partly through the inner race member. The sleeve member 56 is made up of two separable halves 70, 72 each having an outer half rib 74, 76 and each having a pair of projections 78 thereon spaced from the rib. Each projection is at the side margin of the half sleeve, so the projections on each half-sleeve are almost 180° apart.

The inner surface of the inner race member 60 has a tapered skirt portion 80 (which may or may not be for full length) as the inner race member of FIGS. 1 to 4, and the outer surface of the sleeve member is tapered as the sleeve member 16. The sleeve member 56 can be compressed (by pressing at the junction of the two halves) for insertion into the bearing and, when the pressure on the sleeve member is relaxed, the projections 78 will be loosely confined by the openings 66, 68 in the inner race member. As can be seen in FIG. 5, one projection on each sleeve half will be received in opening 66 and one projection on each sleeve half will be received in opening 68. Thus each opening will receive two sleeve member projections. It should be noted that a split sleeve with projections, constructed as the sleeve 56, could, if desired, be used in conjunction with a bearing having an inner race constructed with a groove as the race 20 of FIG. 1.

As in the first embodiment described, the sleeve member 56 can be shipped and stored in engagement with the bearing 54, and the two sleeve halves will remain engaged with the bearing in their relaxed condition. As in the first embodiment, the two sleeve halves can be secured between the inner race member and the shaft, to tightly hold the bearing to the shaft. Also, the bearing can be removed from the shaft in a manner similar to the manner in which bearing 10 is removed from the shaft, although it might be necessary to wedge each half of the sleeve loose.

Both the embodiment of FIGS. 1 to 4, and the embodiment of FIGS. 5 and 6, relate to bearing assemblies in which the bearing is secured tightly to a shaft extending into the inner race of the bearing. In installations like those illustrated, a member, such as a hub or housing, is usually received on the outer race member, and the hub or housing can be tightly secured to the outer race member in the same manner as the inner race member is secured to the shaft. Alternatively, the outer race member only can be clamped to a clamping surface of the hub or bore as shown in FIG. 7.

A bearing 100 is received on shaft 101. The bearing has an inner race member 102 received on the shaft, an outer race member 103, and a circle of balls 104 therebetween held in retainer or cage 105. The bearing and shaft are received in a bore 106 of a housing 107. The bearing 100 is tightly secured in the bore by means of a sleeve member 108. The sleeve member 108 has a tapered inner surface portion 109 and the outer race member 103 has an outer surface portion 110 tapered in a complementary fashion. The sleeve member has an end rib 111 and a locking rib 112 spaced therefrom. Both ribs extend inwardly from the inner surface of the sleeve member, and the locking rib is received loosely in a groove 113 on the outer surface of the outer race member. The sleeve member has a slit (not shown) which extends the entire length of the sleeve member (as the slit 32 of sleeve member 16).

The sleeve member can be expanded, by applying pressure at two points (90° clockwise and 90° counterclockwise from the slit). The expanded sleeve member can fit over the outer race member unil the locking rib 112 is in registration with the groove 113, at which time pressure is removed from the sleeve member to permit it to return to the relaxed condition. In the relaxed condition, the rib 112 is held in the groove 113. When the sleeve member 108 is forced in between the bores 106 and the outer race 103 of the bearing, the bearing will be tightly secured in the bore.

It should be noted that the bearing 100 and sleeve member 108 can be shipped and stored in assembled relation, and the two members will be held together as long as the sleeve member is in the relaxed condition.

Both the inner race and the outer race of a bearing can be tightly secured on a shaft and in a bore, respectively, by means of sleeve members, as shown separately in FIG. 2 and FIG. 7. In other words, a sleeve member with an outwardly extending rib can engage a groove in the inner surface of the inner race of a bearing, and a sleeve member with an inwardly extending rib can engage a groove in the outer surface of the outer race member of the same bearing. This preassembled unit of a bearing and two sleeve members will fit loosely in a bore and will receive a shaft loosely in the inner bearing race. When the inner sleeve member is driven in, the inner race of the bearing will be tightly clamped on the shaft. When the outer sleeve member is driven in, the outer race of the bearing will be tightly clamped in the bore.

In some instances, as when greater loads are involved, it may be desired to secure a bearing on a shaft by means of two opposite wedge sleeves, as shown in FIG. 8. In this embodiment, a roller bearing 118 having an inner race 120, outer race 122a, 122b, and two rows of rollers 124a, 124b, is mounted on a shaft 126. The bearing 118 is secured in housing 127 by nut 127a. Two wedge sleeves 128a, 128b, both similar to the wedge sleeve 16 shown in FIG. 1, extend in from opposite directions between the tapered surfaces 129a, 129b of the inner race 120, and the shaft 126. Both sleeves 128a, 128b have inboard and outboard ribs, 130 and 132 respectively, the inboard ribs defining locking ribs received in the grooves 134, 136 of the inner race. The two wedge sleeves are joined to the bearing 118 in the same manner as the sleeve 16 to bearing 10, so that the three parts can be shipped and stored as a unit.

Although the best mode contemplated for carrying out the present invention has been herein shown and described, it will be apparent that modification and variation may be made without departing from what is regarded to be the subject matter of the invention.

What is claimed is:

1. A bearing construction including a bearing member having a longitudinal axis and having a tapered surface, a sleeve member having a longitudinal axis and having a tapered surface for wedging engagement with the tapered surface on said bearing member, a surface projection on one of said members and a surface cavity on the other of said members normally to hold said members loosely in assembled relationship when said sleeve member is relaxed, said cavity extending axially a greater distance than said projection to permit relative linear axial movement between said members.

2. A bearing construction including a bearing member having a longitudinal axis and having a tapered wedge surface, a resilient sleeve member having a longitudinal axis and having a tapered wedge surface in complementary relationship to the bearing member wedge surface, a surface projection on one of said members, a surface cavity on the other of said members to confine said projection loosely and hold said members in assembled relationship when the resilient sleeve member is relaxed, said cavity extending axially a substantially greater distance than said projection to permit relative linear axial movement between said members, said sleeve member deformable to disengage said projection from said cavity to release said race member and said sleeve member from assembled relationship.

3. A bearing construction including a bearing member surrounding a central bearing axis and having at least one axially extending tapered surface and having radially extending surfaces, an axially extending sleeve member having a central axis essentially coincident with the bearing axis when the sleeve and the bearing member are in assembled relationship, said sleeve member having an axially extending tapered wedge surface in complementary relationship with the axially extending bearing member tapered surface for wedging action therewith, said sleeve member having a longitudinal slit therethrough to render the sleeve member deformable to change the diameter thereof, a projection on one of said members, a cavity on the other of said members of greater axial span than said projection to confine said projection with linear axial lost motion therebetween when the sleeve member is relaxed to hold the sleeve member and the bearing member in assembled relationship, said members disengageable on deformation of the sleeve member.

4. The apparatus of claim 3 in which said sleeve member has a radially extending rib at one end.

5. A bearing construction to be clamped on a longitudinally extending shaft comprising a bearing inner race member having an inner wedge surface, a resilient sleeve member receivable between the inner race member and a shaft, said sleeve member having an outer wedge surface to define a wedge with the inner wedge surface of the inner race member, one of said members having a projection thereon, and the other of said members having a cavity therein of greater axial span than said projection to confine said projection with lost motion to permit relative linear longitudinal wedging motion therebetween, said projection and cavity holding said members in assembled relationship when the sleeve member is relaxed.

6. A bearing construction for mounting on a shaft, a bearing inner race member having a longitudinal axis and having an inner tapered surface, a resilient sleeve member receivable on a shaft, said sleeve member having a longitudinal axis and having an outer tapered surface, said sleeve outer surface tapered in complementary relationship to said bearing inner race member inner surface taper to form a wedge, said sleeve having a slit therein for contraction of the diameter thereof from the diameter of the sleeve when relaxed, one of said members having a projection thereon, the other of said members having a cavity therein of greater axial span than said projection to confine said projection loosely in the cavity to permit axial linear motion of the projection in the cavity, said projection and cavity holding the members in assembled relationship when the sleeve member is relaxed.

7. The apparatus of claim 6 in which said cavity and said projection have edges perpendicular to said axes.

8. A bearing construction for mounting on a shaft comprising a bearing having an inner race and an outer race, the inner race having an inner wedge surface and having a circumferential groove, a resilient sleeve for receipt on a shaft and within said inner race, said sleeve having an outer wedge surface for wedging action with said inner race surface, said sleeve having a circumferential rib narrower than the groove for receipt in said groove to hold the bearing and the sleeve together when the sleeve is relaxed, the relative span of said rib and groove permitting linear wedgeing motion between the sleeve and said inner race.

9. A bearing construction for mounting on a shaft comprising a bearing having an inner race and an outer race, the inner race having a longitudinal axis and having an inner wedge surface, said inner race having a circumferential groove on the inner surface thereof, a resilient sleeve for receipt within said inner race, said sleeve having an outer wedge surface tapering inwardly toward one end for wedging action with said inner race surface, said sleeve having a longitudinal axis and having a circumferential rib on the outer surface thereof narrower than the groove for receipt of the rib in said groove, said sleeve and said groove having edges perpendicular to said axes to hold the bearing and the sleeve together in a positive manner when the sleeve is relaxed, said sleeve slidable relative to the bearing as the rib moves linearly from one side of the groove to the other, said sleeve having a longitudinal slit therein for contraction by wedging action between said wedge surfaces to clamp tightly on a shaft, said sleeve compressible when the bearing and sleeve assembly are off the shaft to release the rib on the sleeve from the groove in the inner race of the bearing, and a radially extending rib on said other end of said sleeve.

10. A bearing construction comprising an inner race member having a longitudinal axis and having an inclined inner wedge surface, said inner race member having a pair of opposed cavities therein, a split sleeve having a longitudinal axis and having an inclined outer wedge surface for wedging engagement with said race member wedge surface, each half of said split sleeve having projections of lesser axial extent than said cavities for extension loosely into said cavities to hold said sleeve and inner race member in assembled relationship, said split sleeve resilient for disengaging said sleeve projections from said race member cavities.

11. A bearing mounting construction comprising an outer race member having an outer tapered wedge surface, said wedge surface having a circumferentially extending groove therein, a sleeve member having a tapered inner wedge surface for wedging engagement with said outer race wedge surface, said sleeve having a circumferentially extending rib thereon narrower than said groove for loose engagement in said groove to hold the members together, said sleeve having an elongated slit therein for deformation of the sleeve to disengage said members.

12. The apparatus of claim 11 in which one said sleeve member has a radially extending rib at one end.

13. The apparatus of claim 11 wherein said groove and rib having upstanding edges to define a position lock between said sleeve and bearing when the sleeve is not deformed.

14. A bearing construction including a bearing member having a pair of opposing tapered surfaces, a pair of opposing sleeve members having longitudinal axes and having tapered surfaces for wedging engagement with the tapered surfaces on said bearing member, surface projections on said sleeve members and surface cavities on said bearing to hold said members loosely in assembled relationship when said sleeve members are relaxed, said surface projections of lesser axial extent than said surface cavities to permit relative linear axial movement between said members.

* * * * *

UNITED STATES PATENT OFFICE
CERTIFICATE OF CORRECTION

PATENT NO. : 3,806,215

DATED : April 23, 1974

INVENTOR(S) : C. E. PRICE et al

It is certified that error appears in the above-identified patent and that said Letters Patent are hereby corrected as shown below:

Col. 8, line 38, change "position" to --positive--;
line 39, after "sleeve" (first occurrence) insert --member--;
line 39, delete "bearing" and insert therefor --outer race member--;
line 39, after "sleeve" (second occurrence) insert --member--.

Signed and Sealed this ninth Day of December 1975

[SEAL]

Attest:

RUTH C. MASON
Attesting Officer

C. MARSHALL DANN
Commissioner of Patents and Trademarks